United States Patent
Murakami et al.

(10) Patent No.: US 10,063,171 B2
(45) Date of Patent: Aug. 28, 2018

(54) CONTROL APPARATUS FOR INTERNAL COMBUSTION ENGINE

(71) Applicant: TOYOTA JIDOSHA KABUSHIKI KAISHA, Toyota-shi, Aichi (JP)

(72) Inventors: Koji Murakami, Susono (JP); Hatsuo Nakao, Gotenba (JP); Mitsuhiro Tabata, Shizuoka-ken (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 1 day.

(21) Appl. No.: 15/112,540

(22) PCT Filed: Oct. 23, 2014

(86) PCT No.: PCT/JP2014/078843
§ 371 (c)(1),
(2) Date: Jul. 19, 2016

(87) PCT Pub. No.: WO2015/111275
PCT Pub. Date: Jul. 30, 2015

(65) Prior Publication Data
US 2016/0336887 A1     Nov. 17, 2016

(30) Foreign Application Priority Data

Jan. 21, 2014 (JP) ................. 2014-008466

(51) Int. Cl.
*H02P 9/08* (2006.01)
*B60W 10/06* (2006.01)
(Continued)

(52) U.S. Cl.
CPC ............... *H02P 9/08* (2013.01); *B60W 10/06* (2013.01); *B60W 10/08* (2013.01); *B60W 30/18* (2013.01);
(Continued)

(58) Field of Classification Search
CPC ........ H02P 9/08; F02D 41/042; F02D 41/045; F02N 11/0818; F02N 19/005
See application file for complete search history.

(56) References Cited

U.S. PATENT DOCUMENTS

| 5,818,116 A * | 10/1998 | Nakae | ................... | B60W 10/06 |
| | | | | 123/339.1 |
| 6,018,198 A * | 1/2000 | Tsuzuki | ................. | B60K 6/365 |
| | | | | 180/65.25 |

(Continued)

FOREIGN PATENT DOCUMENTS

JP          2012-202407 A          10/2012

*Primary Examiner* — Sean Gugger
(74) *Attorney, Agent, or Firm* — Hunton Andrews Kurth LLP

(57) ABSTRACT

A control apparatus for an internal combustion engine is provided with: a first determining device configured to determine whether or not the number of revolutions of the internal combustion engine is less than a predetermined number of revolutions and control torque is required for a rotary electric machine; a second determining device configured to determine whether or not required control torque is less than a predetermined threshold value; a first controlling device configured to realize the control state in one arm and to realize the power generation state if the required control torque is less than the predetermined threshold value; a second controlling device configured to realize the control state in both the one arm and the other arm if the required control torque is greater than the predetermined threshold value; and a threshold changing device configured to change the predetermined threshold value to increase with increasing number of revolutions of the internal combustion engine.

2 Claims, 5 Drawing Sheets

(51) Int. Cl.
*B60W 10/08* (2006.01)
*B60W 30/18* (2012.01)
*F02N 11/08* (2006.01)
*F02D 41/04* (2006.01)
*F02N 19/00* (2010.01)
*H02J 7/14* (2006.01)
*H02P 9/48* (2006.01)
*F02N 11/04* (2006.01)

(52) U.S. Cl.
CPC ..... *B60W 30/18018* (2013.01); *F02D 41/042* (2013.01); *F02D 41/045* (2013.01); *F02N 11/04* (2013.01); *F02N 11/0818* (2013.01); *F02N 19/005* (2013.01); *H02J 7/1446* (2013.01); *H02P 9/48* (2013.01); *B60W 2510/0638* (2013.01); *B60W 2510/0685* (2013.01); *B60W 2710/083* (2013.01); *F02D 2200/101* (2013.01); *F02D 2250/24* (2013.01); *F02N 2011/0874* (2013.01); *F02N 2019/008* (2013.01)

(56) References Cited

U.S. PATENT DOCUMENTS

| | | | | |
|---|---|---|---|---|
| 8,513,924 | B2* | 8/2013 | Horihata | H02P 9/30 322/20 |
| 9,758,160 | B2* | 9/2017 | Gibson | B60W 20/40 |
| 2004/0085047 | A1* | 5/2004 | Suzuki | H02P 9/00 322/20 |
| 2005/0093520 | A1* | 5/2005 | Muramatsu | H02M 7/53871 322/29 |
| 2016/0131100 | A1* | 5/2016 | Chen | F02D 41/042 123/406.58 |

\* cited by examiner

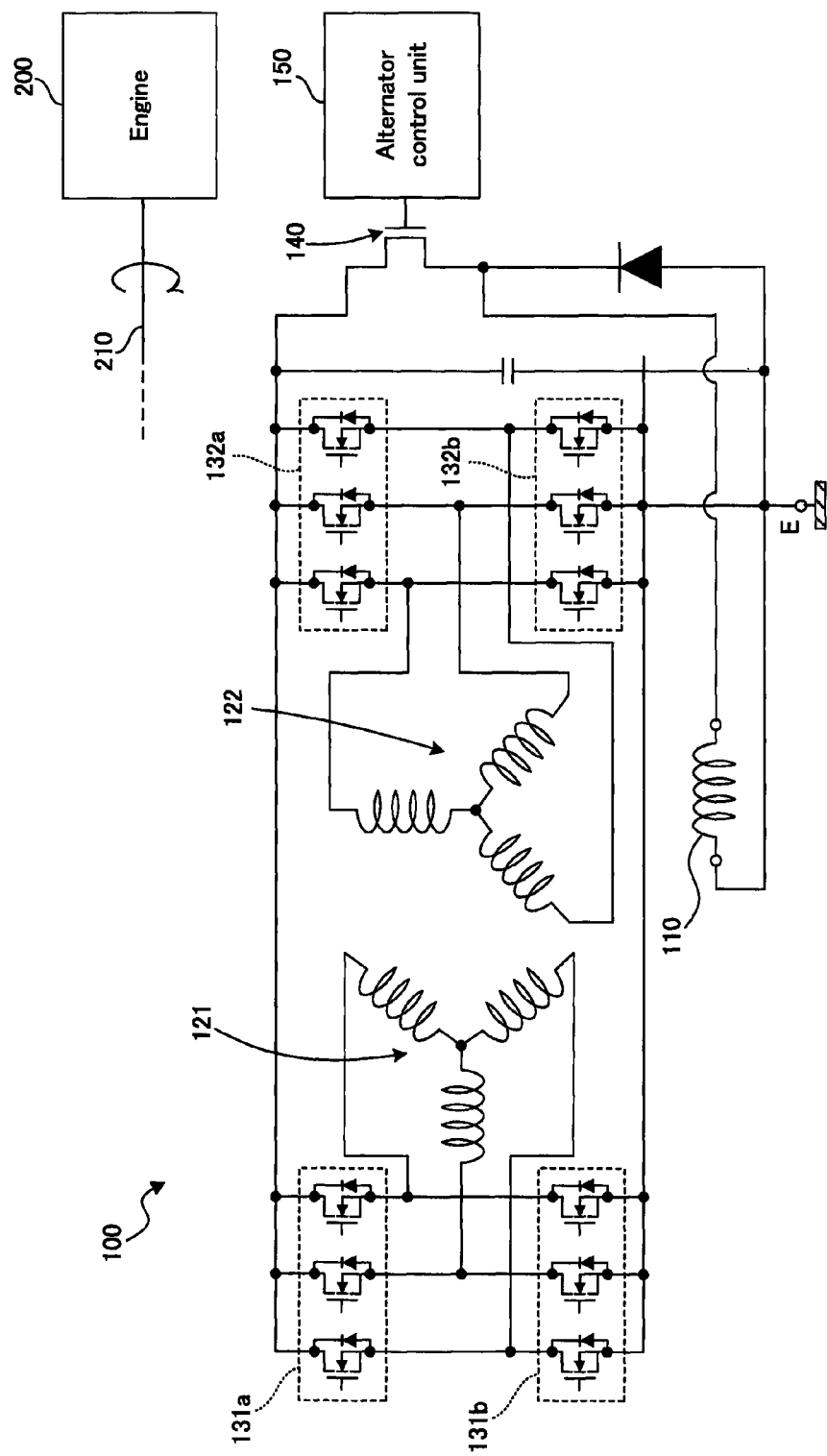
[FIG. 1]

[FIG. 2]
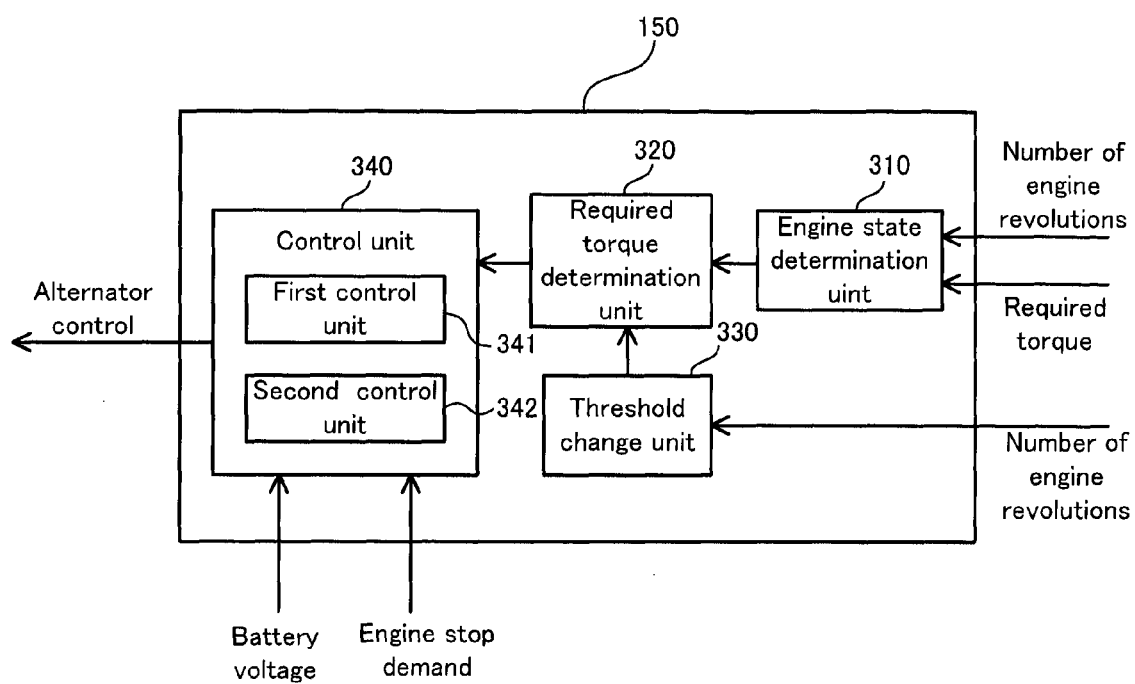

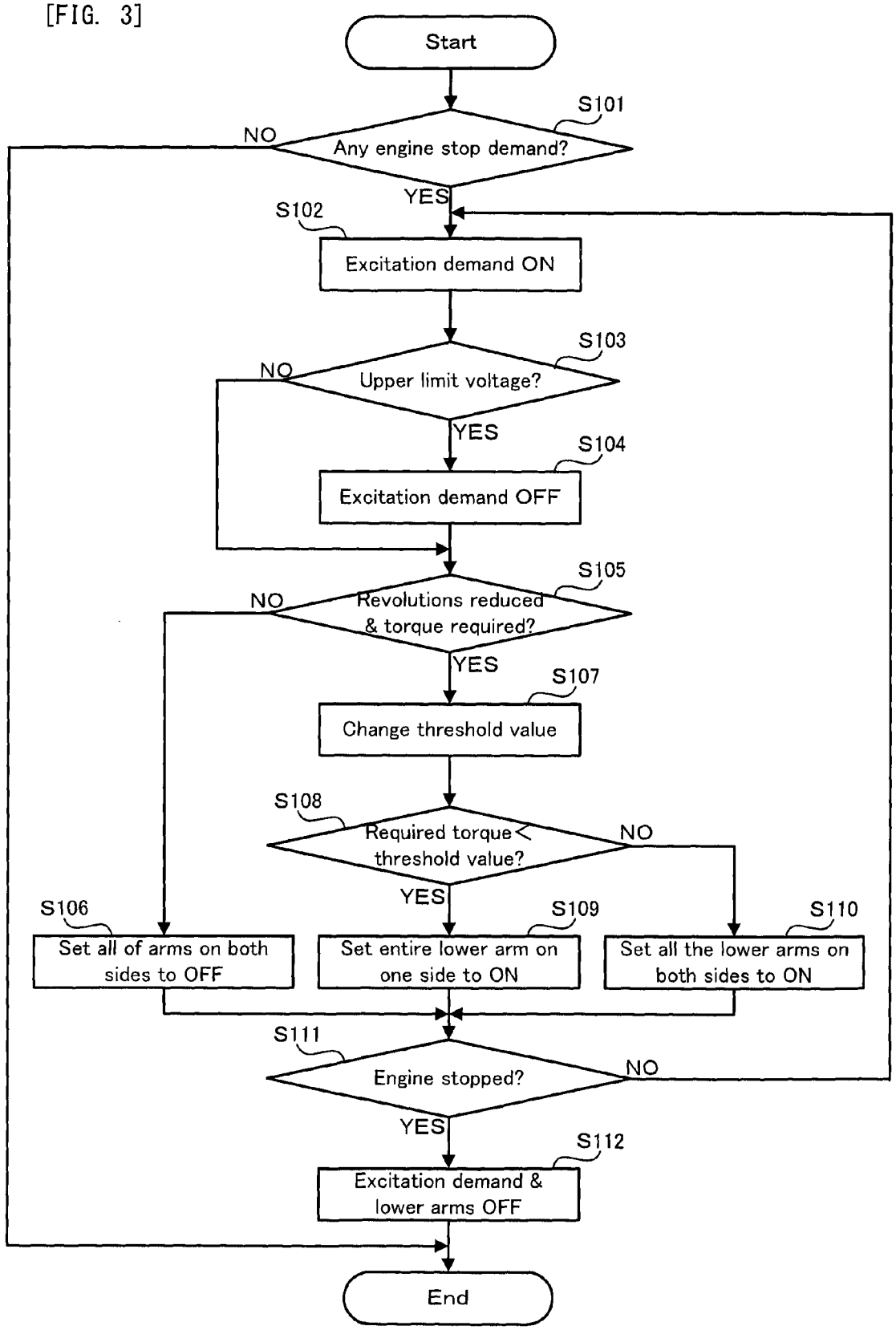
[FIG. 3]

[FIG. 4]
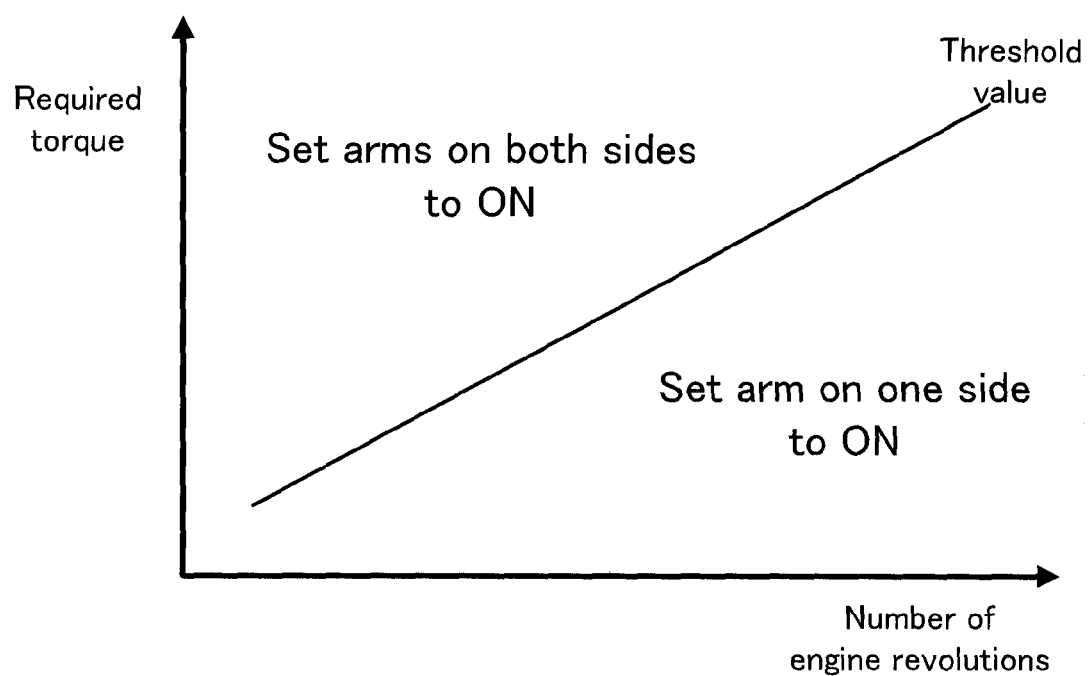

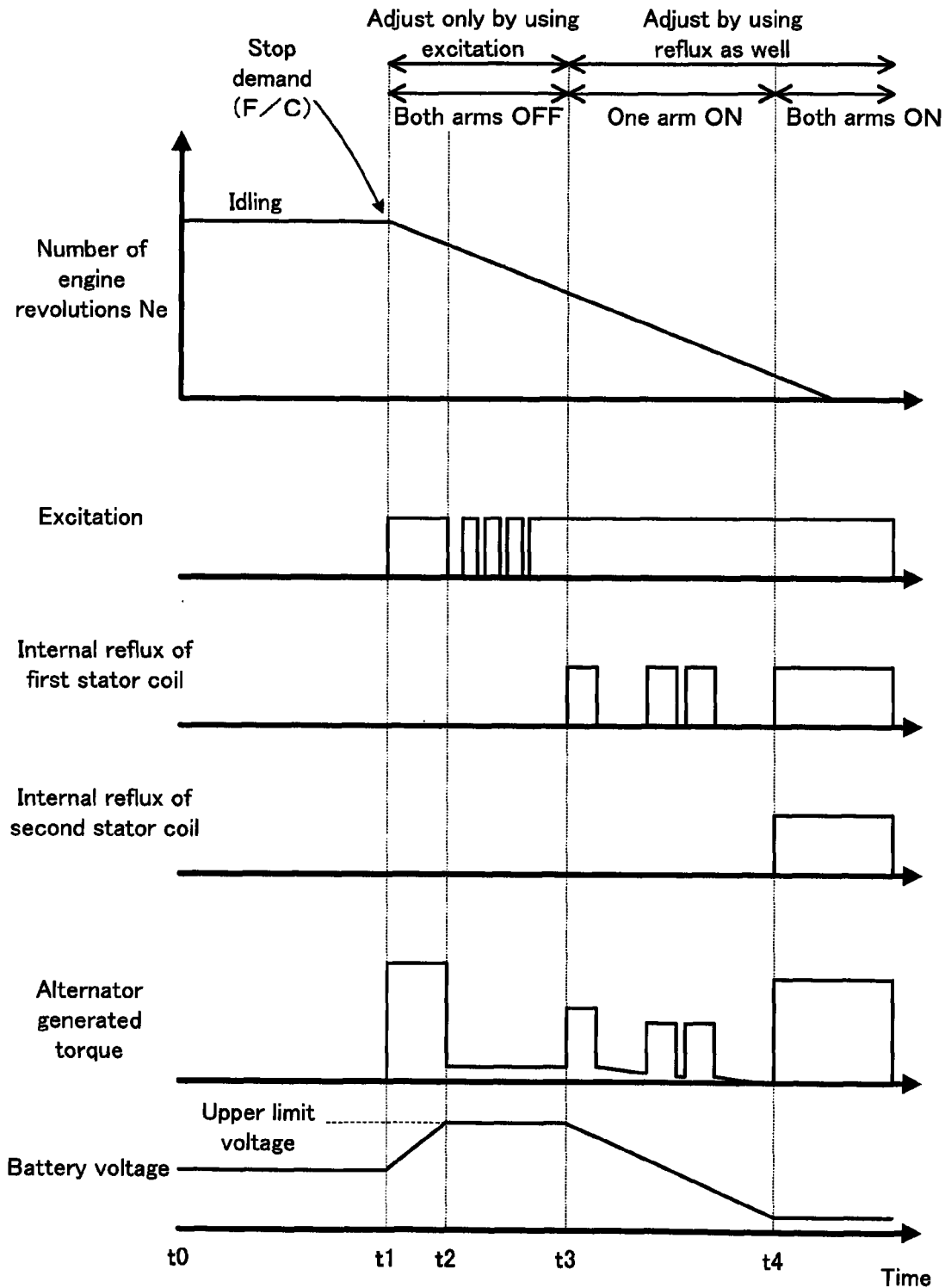

CONTROL APPARATUS FOR INTERNAL COMBUSTION ENGINE

CROSS-REFERENCE TO RELATED APPLICATIONS

This is a national phase application based on the PCT International Patent Application No. PCT/JP2014/078843 filed Oct. 23, 2014, claiming priority to Japanese Patent Application No 2014-008466 filed Jan. 21, 2014, the entire contents of both of which are incorporated herein by reference.

TECHNICAL FIELD

The present invention relates to a control apparatus for an internal combustion engine having a power generating device such as, for example, an alternator.

BACKGROUND ART

In the internal combustion engine, the following control is performed in some cases; namely, for example, a crank angle (i.e. an angle of a crankshaft of the internal combustion engine) when the internal combustion engine stops is set to a predetermined value so that start torque can be reduced when the internal combustion engine restarts. As a method of controlling the crank angle of the internal combustion engine which stops, there is known a method of using torque outputted from an alternator connected to the internal combustion engine.

On the other hand, the alternator can also generate electric power by using power of the internal combustion engine. Therefore, for example, in Patent document 1, there is proposed a technology in which the power generation by the alternator is performed on a high revolution side during stop control of the internal combustion engine and control torque is generated by the alternator on a low revolution side, thereby controlling the crank angle.

CITATION LIST

Patent Literature

Patent Literature 1: Japanese Patent Application Laid Open No. 2012-202407

SUMMARY OF INVENTION

Technical Problem

In the technology described in the aforementioned Patent document 1, a number-of-revolutions threshold value, which is a predetermined fixed value, is used to determine whether to perform the power generation in the alternator or to output the control torque. However, the fact that the threshold value used for the determination is the fixed value is not always preferable from the viewpoint of increasing power generation efficiency. Specifically, whether to perform the power generation in the alternator or to output the control torque cannot be determined only on the basis of the number of revolutions of the internal combustion engine. Therefore, there is a possibility that efficient power generation cannot be performed in the technology described in the Patent document 1, which is technically problematic.

The above is one example of the subject to be solved by the invention includes. It is therefore an object of the present invention to provide a control apparatus for an internal combustion engine which is configured to increase the power generation efficiency during the stop control of the internal combustion engine.

Solution to Problem

The above object of the present invention can be achieved by a control apparatus for an internal combustion engine comprising a rotary electric machine which has a switching element group in each of one arm and another arm and which is configured to control the switching element group to realize a control state which allows output of control torque for controlling a crank stop position of the internal combustion engine and a power generation state which allows power generation by power of the internal combustion engine, said control apparatus provide with: a first determining device configured to determine whether or not it is in a torque demand state in which the number of revolutions of the internal combustion engine is less than a predetermined number of revolutions and in which it is required to output the control torque to the rotary electric machine, if there is a demand for stopping the internal combustion engine; a second determining device configured to determine whether or not required control torque, which is the control torque required for the rotary electric machine, is less than a predetermined threshold value, if it is determined to be in the torque demand state; a first controlling device configured to control the switching element group in the one arm to realize the control state and to control the switching element group in the other arm to realize the power generation state, if it is determined that the required control torque is less than the predetermined threshold value; a second controlling device configured to control the switching element groups in both the one arm and the other arm to realize the control state, if it is determined that the required control torque is greater than the predetermined threshold value; and a threshold changing device configured to change the predetermined threshold value to increase with increasing number of revolutions of the internal combustion engine.

The internal combustion engine of the present invention is configured as an internal combustion engine which can adopt various aspects regardless of a fuel type, a fuel supply aspect, a fuel combustion aspect, an intake/exhaust system configuration, cylinder arrangement, or the like. The internal combustion engine of the present invention is also provided with the rotary electric machine configured, for example, as an alternator and a motor generator. The rotary electric machine is provided with at least the two arms which are the one arm and the other arm, and each of the two arms has a switching element(s).

In each arm of the rotary electric machine of the present invention, the state thereof can be changed by controlling the switching element group. Specifically, the control state which allows the output of the control torque for controlling the crank stop position of the internal combustion engine is realized, for example, by turning on the switching element group in each arm (i.e. by turning on all the switching elements included in the switching element group). More specifically, the state in which the torque can be generated by internal reflux is realized. The control of the crank stop position is performed, for example, to start ignition at the restart of the internal combustion engine. On the other hand, the power generation state which allows the power generation by the power of the internal combustion engine is realized, for example, by turning off the switching element group (i.e. by turning off at least one switching element included in the switching element group). In the power generation state, the amount of the power generation can be adjusted by controlling an excitation state of the rotary electric machine.

Since the switching element group is disposed in each of the one arm and the other arm, the change between the power generation state and the control state described above can be performed in each arm. In other words, the one arm and the other arm can be also set in different states.

The control apparatus for the internal combustion engine of the present invention is a control apparatus configured to control the internal combustion engine as described above, and can adopt forms of various computer systems, such as various microcomputer apparatuses, various controllers, and various processing units, like a single or plurality of electronic control units (ECUs), which can include, as occasion demands, one or a plurality of central processing units (CPUs), micro processing units (MPUs), various processors, various controllers, or further include various storing devices, such as a read only memory (ROM), a random access memory (RAM), a buffer memory, or a flash memory.

According to the control apparatus for the internal combustion engine of the present invention, it is determined by the first determining device whether or not it is in the torque demand state, if there is the demand for stopping the internal combustion engine. The torque demand state is a state in which the number of revolutions of the internal combustion engine is less than the predetermined number of revolutions and in which it is required to output the control torque to the rotary electric machine. Thus, if it is not required to output the control torque to the rotary electric machine even though the number of revolutions of the internal combustion engine is less than the predetermined number of revolutions, it cannot be said that it is in the torque demand state, and this case is not a control target described later. As an example of the case where it is not required to output the control torque, there is, for example, a case where the crank angle of the internal combustion engine stops at a desired angle even though the control torque is not outputted.

If it is determined to be in the torque demand state, it is determined by the second determining device whether or not the required control torque (i.e. the control torque required for the rotary electric machine) is less than the predetermined threshold value.

If it is determined that the required control torque is less than the predetermined threshold value, the switching element group in the one arm is controlled to realize the control state and the switching element group in the other arm is controlled to realize the power generation state, by the first controlling device. In other words, the different states are realized between the one arm and the other arm. In the case of the control as described above, the control torque can be generated in the one arm while the power generation can be performed in the other arm. In other words, the control of the crank stop position of the internal combustion engine and the power generation can be performed in parallel.

Although there is a limit in the control torque which can be outputted from the one arm, there is no problem because the required control torque is determined to be less than the predetermined threshold value. In other words, the predetermined threshold value used by the second determining device may be set according to the control torque which can be outputted only by the one arm.

On the other hand, if it is determined that the required control torque is greater than the predetermined threshold value, the switching element groups in both the one arm and the other arm are controlled to realize the control state by the second controlling device. In other words, the control state can be realized in both the one arm and the other arm. In the case of the control as described above, the control torque can be outputted from each of the one arm and the other arm. It is therefore possible to output sufficient control torque even if the required torque is relatively large.

The control of the crank stop position can be performed only by the control by the second controlling device (i.e. by the control of setting the both arms in the control state), but the control by the first controlling device (i.e. the control of setting the other arm in the power generation state) makes it possible to increase an energy recovery rate when the internal combustion engine is stopped.

Moreover, in the present invention, the predetermined threshold value used by the second determining device can be changed by the threshold changing device. Specifically, in the threshold changing device, the predetermined threshold value is changed to increase with increasing number of revolutions of the internal combustion engine.

Here, if the number of revolutions of the internal combustion engine is relatively high, the power generation can be sufficiently performed by setting each arm of the rotary electric machine in the power generation state. It is also considered that there is a relatively sufficient time until the stop of the internal combustion engine, and it is less necessary to apply the control torque in a hurry. Thus, if the predetermined threshold value is increased (i.e. if the control by the first controlling device is more easily selected) with increasing number of revolutions of the internal combustion engine, an opportunity for the power generation can be efficiently increased.

As explained above, according to the control apparatus for the internal combustion engine of the present invention, it is possible to increase the power generation efficiency during the stop control of the internal combustion engine.

In one aspect of the control apparatus for the internal combustion engine of the present invention, wherein at least one of the one arm and the other arm has an upper switching element group and a lower switching element group, and said first controlling device and said controlling device control any one of the upper switching element group and the lower switching element group, as the switching element group.

According to this aspect, at least one of the one arm and the other arm is configured to have the upper switching element group and the lower switching element group. In other words, either or both of the one arm and the other arm are configured to have at least two switching element groups. The rotary electric machine in this case therefore can be configured as a so-called high efficiency alternator.

Particularly in this aspect, the power generation state and the control state in each arm are realized by controlling any one of the upper switching element group and the lower switching element group when the switching elements are controlled by the first controlling device and the second controlling device. Thus, the other switching element group does not have to be controlled.

The same effect can be achieved even if any of the upper switching element group and the lower switching element group is controlled. However, if there is a switching element group grounded (or connected to the ground), the switching element group provides more stable switching control.

The operation and other advantages of the present invention will become more apparent from an embodiment explained below.

BRIEF DESCRIPTION OF DRAWINGS

FIG. 1 is a schematic configuration diagram illustrating a configuration of an engine system in an embodiment.

FIG. 2 is a block diagram illustrating a configuration of an alternator control unit in the embodiment.

FIG. 3 is a flowchart illustrating the operation of the alternator control unit in the embodiment.

FIG. 4 is a map illustrating a method of setting a required torque threshold value based on the number of engine revolutions.

FIG. 5 is a time chart illustrating one specific example of the operation of the alternator control unit in the embodiment.

DESCRIPTION OF EMBODIMENTS

Hereinafter, an embodiment of the control apparatus for the internal combustion engine will be explained.

(1) Configuration of Engine System in Embodiment

Firstly, with reference to FIG. 1, a configuration of an engine system in the embodiment will be explained. FIG. 1 is a schematic configuration diagram illustrating the configuration of the engine system in the embodiment.

In FIG. 1, the engine system in the embodiment includes, for example, an engine 200 mounted on a vehicle as a power source. The engine 200 is one example of the "internal combustion engine" of the present invention, and is configured to convert a reciprocating motion of a piston according to an explosive force generated when an air-fuel mixture containing fuel is burned in a cylinder, to a rotational motion of a crankshaft 210 through a connecting rod 204.

Moreover, the aforementioned engine 200 is connected to an alternator 100. The alternator 100 is one example of the "rotary electric machine" of the present invention, and is configured to generate electric power by using power of the engine 200 and to output control torque for performing stop position control during stop control of the engine 200. By outputting the control torque, a crank angle when the engine 200 stops can be adjusted, highly accurately. Due to the stop position control of the engine 200, it is possible to preferably reduce start torque when the engine 200 restarts. The alternator 100 may be also configured as a motor generator having the aforementioned function.

The alternator 100 in the embodiment is provided, as main constituents, with a rotor coil 110, a first stator coil 121, a second stator coil 122, an upper first switching element group 131a, a lower first switching element group 131b, an upper second switching element group 132a, a lower second switching element group 132b, a connection transistor 140, and an alternator control unit 150.

The rotor coil 110 is configured to generate a magnetic flux by applying an excitation current.

Each of the first stator coil 121 and the second stator coil 122 is configured by connecting three independent coils with a Y-connection, and is configured to generate electric power by using the magnetic flux generated in the rotor coil 110.

The upper first switching element group 131a and the lower first switching element group 131b are switching element groups disposed on the first stator coil 121 side (hereinafter referred to as a "first arm" as occasion demands), and include a plurality of switching elements configured as, for example, a metal oxide semiconductor field effect transistor (MOSFET).

On the other hand, the upper second switching element group 132a and the lower second switching element group 132b are switching element groups disposed on the second stator coil 122 side (hereinafter referred to as a "second arm" as occasion demands), and include a plurality of switching elements configured as, for example, a MOSFET, as in the upper first switching element group 131a and the lower first switching element group 131b.

If both the upper first switching element group 131a and the lower first switching element group 131b are set to OFF (i.e. if any of the switching elements included in the first switching element group 131a or the lower first switching element group 131b is set to OFF), the first arm is in a power generation state (or a state in which electricity can be generated by using the power of the engine 200). If either of the upper first switching element group 131a or the lower first switching element group 131b is set to ON (i.e. if all the switching elements included in the first switching element group 131a or the lower first switching element group 131b are set to ON), the first arm is in a control state (or a state in which the control torque for the engine 200 can be outputted).

In the same manner, if both the upper second switching element group 132a and the lower second switching element group 132b are set to OFF, the second arm is in the power generation state. Moreover, if either of the upper second switching element group 132a and the lower second switching element group 132b is set to ON, the second arm is in the control state.

A correspondence between ON and OFF of the switching element group and each state realized in the arm, however, is not limited to the above example. In other words, what is required is only that the power generation state and the control state can be changed in each arm by the control of the switching element groups.

The alternator control unit 150 is connected to a base part of the connection transistor 140. The alternator control unit 150 is one example of the "control apparatus for the internal combustion engine" of the present invention, and is configured to control the operation of each part of the alternator 100.

Hereinafter, a configuration of the alternator control unit 150 will be explained in detail with reference to FIG. 2. FIG. 2 is a block diagram illustrating the configuration of the alternator control unit in the embodiment.

In FIG. 2, the alternator control unit 150 is provided with an engine state determination unit 310, a required torque determination unit 320, a threshold change unit 330, and a control unit 340.

The engine state determination unit 310 is one example of the "first determining device" of the present invention, and determines the current state of the engine 200 on the basis of the number of engine revolutions inputted from the exterior and torque required for the alternator 100. Specifically, the engine state determination unit 310 determines whether or not the engine 200 during the stop control is in a state in which particular stop control described later is to be performed. A determination result of the engine state determination unit 310 can be outputted to the required torque determination unit 320.

The required torque determination unit 320 is one example of the "second determining device" of the present invention, and determines whether or not the torque required for the alternator 100 is less than a threshold value. A determination result of the required torque determination unit 320 can be outputted to the control unit 340.

The threshold change unit 330 is one example of the "threshold changing device" of the present invention, and is configured to change the threshold value used in the required torque determination unit 320 on the basis of the number of engine revolutions inputted from the exterior (or inputted from the engine state determination unit 310).

The control unit 340 is configured to output a control command to the alternator 100, and controls the operation of the alternator 100 on the basis of, for example, a demand for stopping the engine 200, battery voltage, or the like. The control unit 340 in the embodiment is particularly provided with a first control unit 341 which is one example of the "first controlling device" of the present invention, and a second control unit 342 which is one example of the "second controlling device" of the present invention. The first control unit 341 and the second control unit 342 selectively perform the control of the alternator 100 according to the determination result of the required torque determination unit 320.

Incidentally, specific processing performed by the alternator control unit 150 will be explained in detail below.

(2) Operation of Alternator Control Unit

Next, with reference to FIG. 3, the operation of the alternator control unit 150 will be explained. FIG. 3 is a flowchart illustrating the operation of the alternator control unit in the embodiment. Hereinafter, out of the control which can be performed by the alternator control unit 150, processing deeply related to the present invention will be explained in detail, and the explanation of other general processing will be omitted.

In FIG. 3, according to the alternator control unit 150 in the embodiment, if there is a demand for stopping the engine 200 (step S101: YES), firstly, an excitation demand is set to ON, and control of applying the excitation current to the rotor coil 100 (or increasing the excitation current) is performed (step S102). At this time point, all of the upper first switching element group 131*a*, the lower first switching element group 131*b*, the upper second switching element group 132*a*, and the lower second switching element group 132*b* are OFF, and the power generation state is realized. Thus, by applying the excitation current to the rotor coil 110 to generate the magnetic flux, the power generation by the alternator 100 is started.

During the power generation of the alternator 100, the voltage of a battery in which the generated electric power is stored is monitored, and if it is determined that the voltage reaches a predetermined upper limit voltage (step S103: YES), the excitation demand is set to OFF, and control of stopping the application of the excitation current to the rotor coil 110 (or reducing the excitation current) is performed (step S104). This prevents that the battery voltage exceeds the upper limit voltage due to excessive power generation.

If it is determined that the battery voltage does not reach the predetermined upper limit voltage (the step S103: NO), the processing in the step S104 is omitted. In other words, the application of the excitation current to the rotor coil 110 is continued, and the power generation is continued.

Then, it is determined by the engine state determination unit 310 whether or not the number of revolutions of the engine 200 is less than a predetermined number of revolutions and whether or not it is required to output the control torque to the alternator 100 (step S105).

Here, if it is determined that the number of revolutions of the engine 200 is not less than the predetermined number of revolutions or that it is not required to output the control torque to the alternator 100 (the step S105: NO), then, all of the upper first switching element group 131*a*, the lower first switching element group 131*b*, the upper second switching element group 132*a*, and the lower second switching element group 132*b* are kept OFF (step S106). Thus, the power generation is continued in both the first arm and the second arm. In this case, since the power generation is performed in the two arms, the amount of the power generation can be kept large.

On the other hand, if it is determined that the number of revolutions of the engine 200 is less than the predetermined number of revolutions and that it is required to output the control torque to the alternator 100 (the step S105: YES), the threshold value (i.e. the threshold value used for the determination by the required torque determination unit 320) is changed by the threshold change unit 330 (step S107). The threshold change unit 330 significantly changes the threshold value for a required driving force, with increasing number of revolutions of the engine 200. In other words, in the threshold change unit 330, the threshold value for the required driving force is changed to a relatively small value if the number of revolutions of the engine 200 is relatively low. On the other hand, if the number of revolutions of the engine 200 is relatively high, the threshold value for the required driving force is changed to a relatively large value.

If the threshold value is changed, it is determined by the required torque determination unit 320 whether or not the required torque for the alternator 100 is less than the threshold value after the change (step S108).

If it is determined that the required torque for the alternator 100 is less than the threshold value after the change (the step S108: YES), any of the lower arms of the first arm and the second arm (i.e. either the lower first switching element group 131*b* or the lower second switching element group 132*b*) is set to ON. In this case, out of the first arm and the second arm, one arm is in the power generation state, and the other arm is in the control state. Specifically, if the lower first switching element group 131*b* is set to ON, the first arm is in the control state, and the second arm is in the power generation state. Moreover, if the lower second switching element group 132*b* is set to ON, the first arm is in the power generation state, and the second arm is in the control state.

As described above, during the control by the first control unit 341, the first arm and the second arm are in state different from each other. In this case, the power generation is performed in one arm which is in the power generation state, and the control torque is generated in the other arm which is in the control state. It is therefore possible to perform the power generation using the power of the engine 200 and the stop position control of the engine 200.

Incidentally, there is a limit in the control torque which can be outputted from the one arm; however, there is no problem because it is determined that the required torque is less than the threshold value. In other words, the threshold value used in the required torque determination unit 320 may be changed according to the control torque which can be outputted only by the one arm.

On the other hand, if it is determined that the required torque is greater than the threshold value after the change (the step S108: NO), both the lower arms of the first arm and the second arm (i.e. both the lower first switching element group 131*b* and the lower second switching element group 132*b*) are set to ON. In this case, both the first arm and the second arm are in the control state.

As described above, during the control by the second control unit 342, both the first arm and the second arm are in the control state. In this case, the control torque can be outputted from the both arms, and that increases the upper limit of the control torque which can be outputted as a whole. It is therefore possible to output sufficient control torque even if the required torque is relatively large.

The stop position control of the engine 200 can be performed only by the control by the second control unit 342

(i.e. by the control of setting the both arms in the control state), but the control by the first control unit 341 (i.e. the control of setting the other arm in the power generation state) makes it possible to increase an energy recovery rate when the engine 200 is stopped.

The case of controlling the lower arms of the first arm and the second arm was explained herein; however, the upper arms may be controlled. In the alternator 100 in the embodiment, the reference potential of the lower arms is grounded (or connected to the ground), and the lower arms thus have a more stable reference potential than that of the upper arms. Thus, the lower arms are preferable as a control target in the embodiment because switching control can be performed, more accurately.

In the embodiment, moreover, the threshold value used in the required torque determination unit 320 can be changed by the threshold change unit 330, as described above. Thus, the control by the first control unit 341 and the control by the second control unit 342 are preferably performed according to circumstances.

Hereinafter, with reference to FIG. 4, an effect due to the change in the threshold value will be specifically explained. FIG. 4 is a map illustrating a method of setting a required torque threshold value based on the number of engine revolutions.

In FIG. 4, the threshold value for the required torque is changed to increase with increasing number of revolutions of the engine 200. Therefore, as is clear from the drawing, as the number of revolutions of the engine 200 increases, the control by the first control unit 341 which allows the power generation is more easily selected.

Here, if the number of revolutions of the engine 200 is relatively high, the power generation can be sufficiently performed by setting each arm of the alternator 100 in the power generation state (namely, if the number of revolutions of the engine 200 is low, there is a possibility that the power generation cannot be performed even if each arm of the alternator 100 is set in the power generation state. Moreover, if the number of revolutions of the engine 200 is relatively high, it is considered that there is a relatively sufficient time until the stop of the engine 200, and it is less necessary to apply the control torque in a hurry. Thus, if the control by the first control unit 341 is more easily selected with increasing number of revolutions of the engine 200, an opportunity for the power generation can be efficiently increased.

Lastly, with reference to FIG. 5, a specific example of the operation of the alternator control unit 150 will be explained. FIG. 5 is a time chart illustrating one specific example of the operation of the alternator control unit in the embodiment.

In FIG. 5, it is assumed that the stop demand is made at a time point t1 for the engine 200 which is idling at a time point t0. In this case, the power generation by the alternator 100 is performed between the time point t0 and the time point 1, but the amount of the power generation is suppressed because the power generation uses fuel.

At the time point t1, the demand for stopping the engine 200 is made. Thus, fuel cut for the engine 200 is performed, and the number of revolutions of the engine 200 gradually decreases. At this time, in the alternator 100, the excitation current is maximized, and maximum power generation is performed in the both arms (i.e. the first arm and the second arm).

At a time point t2, the battery voltage reaches the upper limit voltage. Thus the excitation current is adjusted so that the battery voltage does not exceed the upper limit voltage.

At a time point t3, the battery voltage starts to decrease even if the excitation current is maximized, due to the decrease in the number of revolutions of the engine 200 (namely, the power generation cannot be performed until the battery voltage is maintained). Thus, after the time point t3, the arm on one side (or the first arm herein) is set to ON as occasion demands, according to a control torque demand, by which the control torque by internal reflux is generated. It is therefore possible to perform the stop position control of the engine 200 while performing the power generation.

At a time point t4, the number of revolutions of the engine 200 has an extremely low value, and the alternator 100 cannot perform the power generation even in the power generation state. Thus, after the time point t4, the arms on the both sides (or the first arm and the second arm) are set to ON as occasion demands, according to the control torque demand, by which the control torque is generated in the both arms. It is therefore possible to output the sufficient control torque even if the required torque is large, thereby preferably stopping the engine.

As explained above, according to the control apparatus for the internal combustion engine in the embodiment, it is possible to increase the power generation efficiency during the stop control of the engine 200.

The present invention is not limited to the aforementioned embodiment, but various changes may be made, if desired, without departing from the essence or spirit of the invention which can be read from the claims and the entire specification. A control apparatus for an internal combustion engine which involves such changes is also intended to be within the technical scope of the present invention.

DESCRIPTION OF REFERENCE NUMERALS

100 alternator
110 rotor coil
121 first stator coil
122 second stator coil
131a upper first switching element group
131b lower first switching element group
132a upper second switching element group
132b lower second switching element group
140 connection transistor
150 alternator control unit
200 engine
210 crankshaft
310 engine state determination unit
320 required torque determination unit
330 threshold change unit
340 control unit
341 first control unit
342 second control unit

The invention claimed is:

1. A control apparatus for an internal combustion engine comprising a rotary electric machine having a switching element group in each of one arm and another arm and the rotary electric machine is configured to control the switching element group to realize a control state allowing output of control torque for controlling a crank stop position of the internal combustion engine and a power generation state allowing power generation by the internal combustion engine, said control apparatus comprising:

a first determining device configured to determine whether or not the internal combustion engine is in a torque demand state when the number of revolutions of the internal combustion engine is less than a predetermined number of revolutions, when the internal combustion engine is required to output the control torque to the rotary electric machine, and when there is a demand for stopping the internal combustion engine;

a second determining device configured to determine whether or not required control torque for the rotary electric machine is less than a predetermined threshold value, when the internal combustion engine is in the torque demand state;

a first controlling device configured to control the switching element group in the one arm to realize the control state and to control the switching element group in the other arm to realize the power generation state, when the required control torque is less than the predetermined threshold value;

a second controlling device configured to control the switching element groups in both the one arm and the other arm to realize the control state, when the required control torque is greater than the predetermined threshold value; and a threshold changing device configured to change the predetermined threshold value to increase with increasing number of revolutions of the internal combustion engine.

2. The control apparatus for the internal combustion engine according to claim 1, wherein at least one of the one arm and the other arm has an upper switching element group and a lower switching element group, and said first controlling device and said controlling device control any one of the upper switching element group and the lower switching element group as the switching element group.

* * * * *